(No Model.)
F. J. CROUCH.
GALVANIC BATTERY.
No. 374,456. Patented Dec. 6, 1887.
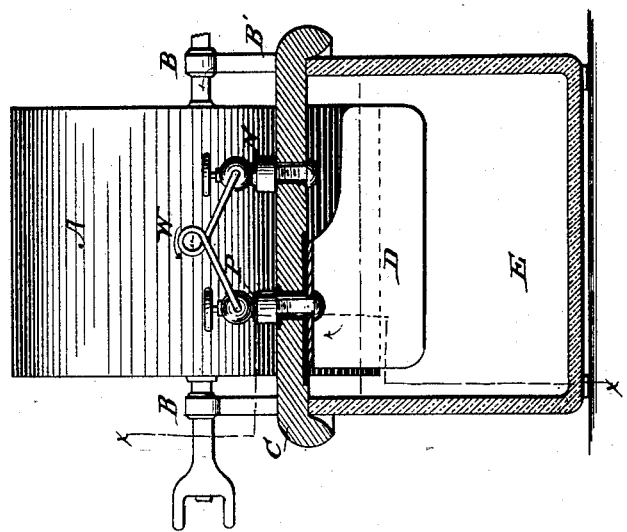
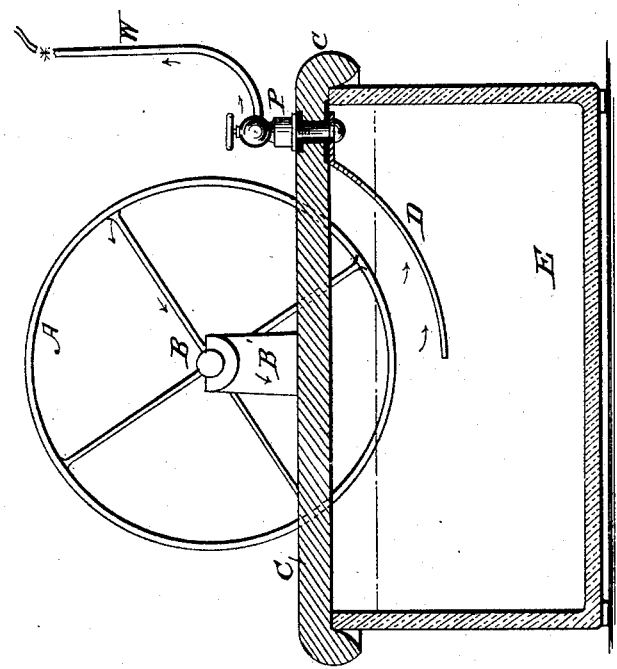
WITNESSES:
Fred G. Dieterich
Edw. W. Byrn
INVENTOR:
F. J. Crouch
BY Munn & Co
ATTORNEYS.

UNITED STATES PATENT OFFICE.

FRANK J. CROUCH, OF EUGENE CITY, OREGON.

GALVANIC BATTERY.

SPECIFICATION forming part of Letters Patent No. 374,456, dated December 6, 1887.

Application filed September 2, 1887. Serial No. 248,653. (No model.)

*To all whom it may concern:*

Be it known that I, FRANK J. CROUCH, of Eugene City, in the county of Lane and State of Oregon, have invented a new and useful Improvement in Galvanic Batteries, of which the following is a specification.

My invention relates to galvanic batteries of that form in which one of the elements is revolved to constantly bring new portions of the same into contact with the exciting-fluid; and it consists in the peculiar construction and arrangement of parts, which I will now proceed to fully describe.

Figure 1 is a side elevation partly in section, and Fig. 2 is an end elevation partly in section.

E is a tank made of glass or porcelain, which is designed to contain the exciting-fluid.

C is a metal plate which is provided with a downwardly-projecting lip or flange, c, which extends down around the outer edge of the vessel E and holds said plate in place against slipping off. This plate C forms both the cover for the vessel E and also the support for the electro-positive and electro-negative elements.

D is the electro-positive element, which is made of a sheet of zinc supported from the under side of the plate C and extending down into the exciting-fluid in a curved form. This element is secured by a screw passing through the supporting-plate C and connecting with the binding-post P, which binding-post, screw, and zinc plate are insulated from the supporting-plate by hard rubber or other con conductor of electricity.

A is the electro-negative element, which by preference I construct of lead, but which may be made of carbon or any metal which is electro-negative with respect to zinc. This element is constructed as a broad ring having radial arms which form a wheel or drum, and which is rigidly attached to a shaft, B, which revolves on bearings in the tops of uprights B', rising from the plate C.

The exciting-fluid which I use is simple salt-water or water with chloride of sodium dissolved in it. In some cases for greater strength and intensity I use sal-ammoniac. The lower portion of the periphery of the drum A and also the plate D dip down beneath the level of the exciting-fluid, as shown by the dotted line, and generate a current which flows from one of the binding-posts, P, to the other, N, through wire W, the binding-post N being in electrical connection with the drum A through its shaft B, uprights B', and plate C.

The object in constructing the element A in the form of a revolving drum is as follows: I have observed that when the elements of a battery are first dipped into the exciting-fluid a strong current is at first set up, which soon dies away, but which can be renewed again by withdrawing the elements and exposing them to the influence of the air. My invention, it will be seen, continually dips one portion of the element A into the exciting-fluid and continually exposes the upper portion to the air, so as to take advantage continually of the vigorous current that arises from the alternate exposure of the surface to the air and contact with the exciting-fluid. The revolving drum A may be kept in motion by a clock-work or by an electric motor, which is itself actuated by the current generated by this battery.

I do not claim, broadly, a battery having a rotating element; but,

Having thus described my invention, what I claim as new is—

The combination of the vessel E, the cover C, having the element D attached to its lower side and extending down into the vessel E, the rotating drum A, mounted upon bearings on the plate C and also extending down into the vessel E, the binding-posts P and N, connected, respectively, to the plate D and drum A and insulated from each other, and an exciting-fluid, substantially as described.

FRANK J. CROUCH.

Witnesses:
GEORGE S. WASHBURNE,
A. C. WOODCOCK.